Sept. 27, 1932.  H. R. MINOR  1,879,397

VALVE

Filed Nov. 14, 1929

Inventor
Henry R. Minor.
By his Attorneys Danby & Danby

Patented Sept. 27, 1932

1,879,397

UNITED STATES PATENT OFFICE

HENRY R. MINOR, OF OSSINING, NEW YORK, ASSIGNOR TO WALTER KIDDE & COMPANY, INC., A CORPORATION OF NEW YORK

VALVE REISSUED

Application filed November 14, 1929. Serial No. 407,047.

This invention relates in general to improvements in valves.

One of the objects of this invention is the provision of a valve of particular construction for use in a fire extinguishing apparatus employing carbon dioxide gas under high pressures.

Another object of this invention involves a valve construction for use under conditions of very high pressure in which a locking device is employed for preventing the valve from accidently opening and permitting the escape of the fluid held in check thereby.

A still further object of this invention involves a valve construction of the above general type with the parts so arranged that the valve may be moved from closed to fully opened position with a half turn of the valve stem.

An additional object of this invention is the provision of a safety disc detachably secured to the valve stem and arranged so as to be subject to the pressure held in check by the valve so that it may be ruptured under conditions of abnormal pressure to permit the escape of the fluid.

Another object of this invention is the provision of a valve having a stem with a central bore which is closed by means of a safety disc, which disc is held in place by means of a threaded cap and washer, which washer forms the valve head.

These and other objects, as will appear from the following disclosure, are secured by means of this invention.

This invention resides substantially in the combination, construction, arrangement, and relative location of parts, all as will be set forth in greater detail in the following description.

Referring to the drawing—

Figure 3:
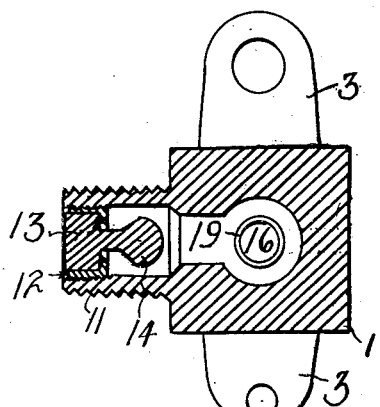
Fig. 3 is a cross sectional view taken on the line 3—3 of Fig. 1.
Figure 4:
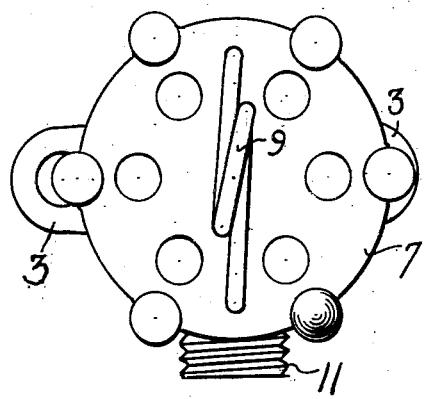
Fig. 4 is a top plan view of the valve.
Figure 1:
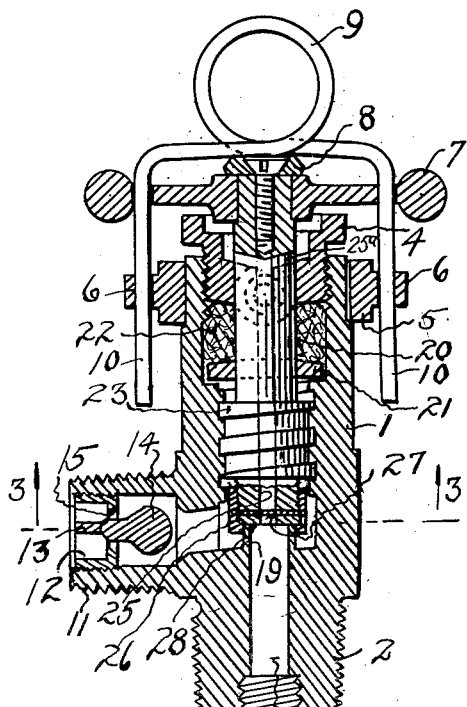
Figure 1 is a vertical cross sectional view through the valve showing all the features of construction.
Figure 2:
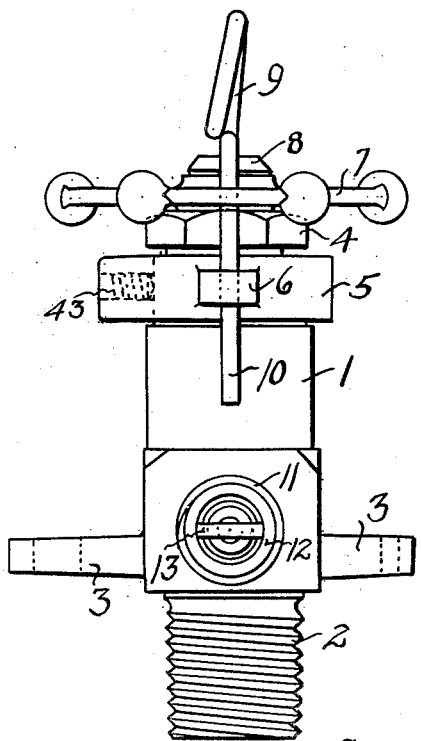
Fig. 2 is a side elevational view of the valve looking at right angles to the view in Fig. 1.

It is becoming common practice to employ carbon dioxide gas for the purpose of extinguishing fires in place of water and various chemical extinguishing means because of the fact that carbon dioxide gas is highly efficient for fire extinguishing and does not cause damage which other extinguishing agents now in use do. The carbon dioxide gas is maintained under very heavy pressure within steel cylinders and at ordinary temperatures the pressure employed is such that the carbon dioxide within the cylinder is in liquid form. In employing this gas for these purposes various precautions are necessary. For instance, it is necessary to prevent the leakage of the carbon dioxide from the containers during the long periods in which they are not in use for the obvious reason that if the gas leaks away the extinguishing system becomes valueless. Since carbon dioxide is fairly expensive should even small leaks occur when the gas is in general use a considerable loss would result.

In view of the great pressures under which the carbon dioxide is maintained it is also necessary to provide a special form of valve construction which will unseat to fully opened position very quickly since the gas which escapes at great rapidity has a tendency to wear away the valve seat if the valve does not open quickly to provide a large area of escape. In view of the tremendous pressures under which the carbon dioxide is maintained it is necessary to provide some form of safety mechanism in the system to permit the escape of gas under abnormal pressure conditions. It has also been found under these conditions that the best results are secured with a valve seat of relatively small area, that is one that has a narrow edge relative to standard practice. Furthermore, it has been found that metal seats are not entirely satisfactory and this invention contemplates the use of a hard fiber washer for the valve head. The valve of this invention has been devised to care for all of these contingencies without requiring the construction of a complicated and expensive valve.

It is an object of the present invention to provide a shut-off valve for containers of a medium under high pressure, which valve shall not only be tightly closed against leakage, but which shall be easily opened when necessary. It is a well-known fact that tightness against leakage can be obtained by use of valve stem threads of low pitch, so that the valve may be locked tightly on its seat. However, the more tightly the valve is locked on the seat, the greater is the difficulty in opening the valve when necessary. Therefore, in order to make the valve easier to open, a thread of considerably larger pitch is employed, with the result that the valve is more subject to accidental opening under the pressure of the contained medium due to vibration or other forms of jarring. Therefore, in accordance with the present invention, means is provided for locking the valve against the pressure of the medium in the container, and, for the want of a better term to express the idea, it can be said that the valve in accordance with the present invention is resiliently locked against the load, or in other words, against the pressure of the medium in the container.

Referring to the drawing for a more detailed disclosure, the valve is shown comprising the body 1 having the integral threaded extension 2 by means of which it is attached to the cylinder containing carbon dioxide. The valve body is provided with apertured lugs 3 for suitably supporting the valve or attaching any other desired mechanism thereto.

The valve body is hollow so as to provide a passage therethrough and is closed at its upper end by means of a threaded plug 4 which likewise has a bore through which the valve stem may pass. Lying below the plug 4 and encircling the valve body is a collar 5 which is secured at any desired circumferential position by means of set screw 43. The collar 5 is formed with integral lugs 6 which have holes therethrough for a purpose to be described. The valve stem is shown at 20 and has secured to its upper end a suitable hand wheel 7 by means of a screw and washer 8. The hand wheel 7 is provided with two diametrically opposed holes. A wire locking member comprising a handle 9 and the straight parallel portions 10 is applied to the valve as shown in the drawing so that the portions 10 extend through the holes in the hand wheel 7 and the holes in the lugs 6 of collar 5 to prevent undesired rotation of the valve stem 20. The collar 5 may be positioned by loosening set screw 43 so that the holes in lugs 6 align with the holes in hand wheel 7 when the valve is firmly seated.

Explaining the matter of resilient locking somewhat in further detail, it should be noted, with reference to the drawing of the present application, that the collar 5 rests loosely on the valve body 1 during the time that the locking member 9 is passed through the holes in the handwheel 7 and then through the holes in the collar 5 and that in practice the collar 5 is then rotated slightly in the direction of tightening of the valve, so that a slight twist is placed upon the locking member 9 with the further result that the valve is locked against the load by the springiness of the locking member. However, it should be noted that the parts are so designed that the locking member 9 can easily be withdrawn, when necessary, from the holes in both the collar and the handwheel. It is this feature of the invention which has already been referred to as resilient locking of the valve against the load.

The valve body 1 is also provided with one other threaded extension, 11. The threaded extension 11 is internally threaded for a short distance to receive the externally threaded thimble 12 which has a hole therethrough and a conical seat defining the hole as shown at 15. A rectangular plate 13 is slidably mounted in a groove in thimble 12 and is formed integral with the ball shaped member 14 which when in contact with the conical seal 15 closes off the passage in the threaded extension 11.

The cylinder to which the valve is attached is filled with gas through the threaded extension 11 and when the flexible hose is applied to the extension 11 to connect it with the gas source the hose contacts with the plate 13 which normally extends beyond the end of the extension 11 to unseat the ball valve 14. When the hose is removed should the main valve be opened the pressure of the gas will cause the ball valve 14 to prevent the escape of gas from the extension 11.

The passage in the lower portion of the valve is indicated at 16 and is provided with a seat 19 of relatively small area. The valve stem 20 is encircled by a suitable disc or washer 21. A space is thus provided between the washer 21 and plug 4 as shown at 22 in which any suitable packing material may be placed. The valve stem 20 is provided with heavy square threads with relatively wide bearing surfaces which cooperate with threads formed on the internal surface of the valve body 1 by means of which the valve is raised and lowered when the hand wheel is rotated. The threads on the valve stem are so proportioned that the valve is completely opened or closed by a half turn of the valve stem. The valve stem 20 is provided with a passage 25 extending therethrough which is closed by means of a safety disc 27. Passage 25 opens into the atmosphere through branches 25$^a$. Of course, the screw which holds wheel 7 in place could be made hollow and passage 25 extend through the screw into the atmosphere. This safety disc is in its best form constructed of thin gauge copper and plated with a very thin coating of gold.

From the foregoing detailed description, the operation and functions of this valve will be at once apparent. Since I am well aware that many changes in the details of construction and relative arrangement of parts will readily occur to those skilled in the art I wish it to be understood that the disclosure has been given for the purpose of illustrating the principles of this invention and it is my desire to be limited not to this description, but to the scope of the appended claims.

What I seek to secure by United States Letters Patent is:

1. A valve for use in carbon dioxide fire extinguishing systems comprising a valve body having a seat therein, a valve stem threadedly mounted in the valve body, a valve head on the valve stem for cooperation with the seat, means for rotating the valve stem having holes therethrough, a rotatably adjustable collar mounted on the valve body having pierced lugs, and a wire member adapted to extend through the holes in the means for rotating the valve stem and the pierced lugs to lock the valve in closed position.

2. In a valve construction of the type described, the combination comprising a valve body having a seat of relatively small area formed therein, a valve stem threadedly mounted in the valve body and having a bore extending therethrough and exposed to the atmosphere, a safety disc closing the end of the bore, a fiber washer with a central bore overlying the safety disc, means for holding said disc and washer on said stem, and means for rotating said valve stem.

3. In a valve construction of the type described, the combination comprising a valve body having a seat of relatively small area formed therein, a valve stem longitudinally movable in the valve body and having a bore extending therethrough and exposed to the atmosphere, a safety disc closing the end of the bore, a fiber washer with a central bore overlying the safety disc, means for holding said disc and washer on said stem, means for moving said valve stem, and means for locking the valve in closed position.

4. In a valve construction of the type described, the combination comprising a valve body, a threaded extension thereon having a passage opening through a seat formed within the valve body, a valve stem having relatively large square threads formed thereon, similar threads formed on the interior of the valve body, a fiber seat detachably secured to the lower end of the valve stem for cooperation with said valve seat, means for rotating the valve stem for opening and closing the valve from one extreme to the other upon a half turn of the valve stem, an adjustable collar secured to the valve body having pierced lugs, said means for rotating the valve stem having two holes therein, and means extending through the holes in the valve stem operating means and the pierced lugs for locking the valve in closed position.

5. In a valve construction of the type described the combination comprising a valve body having a seat formed therein, a valve stem threadedly mounted in the valve body and having a bore extending therethrough and in communication with the atmosphere, a safety disc closing the end of the bore, a non-metallic washer with a central bore overlying said safety disc, means for holding said disc and washer on said stem, and means for operating said valve stem.

6. In a valve construction of the type described, the combination comprising a valve body having a seat formed therein, a valve stem threadedly mounted in the valve body and having a bore extending therethrough and in communication with the atmosphere, a safety disc closing the end of the bore, a non-metallic washer with a central bore overlying said safety disc, means for detachably holding said disc and washer on said stem, and means for rotating said valve stem.

7. A valve for use in carbon dioxide fire extinguishing systems comprising a valve body having a seat therein, a valve stem threadedly mounted in the valve body, a valve head on the valve stem for co-operation with the seat, means for rotating the valve stem having a hole therethrough, a rotatable collar adjustably secured to the valve body having a pierced lug, and a locking member adapted to extend through the holes in the means for rotating the valve stem and the pierced lug to lock the valve in closed position.

8. A valve for use in carbon dioxide fire extinguishing systems comprising a valve body having a seat therein, a valve stem threadedly mounted in the valve body, a valve head on the valve stem for co-operation with the seat, means for rotating the valve stem having a hole therethrough, a rotatable collar adjustably secured to the valve body having a pierced lug, and a locking member adapted to extend through the holes in the means for rotating the valve stem and the pierced lug to lock the valve in closed position, the locking being effected by rotating the collar to a position to place a closing torque on the means for rotating the valve stem, through the medium of the locking member, the collar then being secured in such position.

9. A valve for use in carbon dioxide fire extinguishing systems comprising a valve body having a seat therein, a valve stem threadedly mounted in the valve body, a valve head on the valve stem for co-operation with the seat, means for rotating the valve stem having a hole therethrough, a rotatable collar adjustably secured to the valve body having a pierced lug, and a resilient wire member adapted to extend through the holes in the means for rotating the valve stem and the pierced lug to lock the valve in closed position, the locking being effected by rotating the collar to a position to place a closing torque on the means for rotating the valve stem, through the medium of the resilient wire member the collar then being secured in such position.

10. A valve for use in carbon dioxide fire extinguishing systems comprising a valve body having a seat therein, a valve stem threadedly mounted in the valve body, a valve head on the valve stem for co-operation with the seat, means for rotating the valve stem, rotatable means adjustably secured to the valve body, and a locking member adapted to engage the means for rotating the valve stem and the rotatable means to lock the valve in closed position, the locking being effected by rotating the rotatable means to a position to place a closing torque on the means for rotating the valve stem, through the medium of the locking member, the rotatable means then being secured in such position.

In testimony whereof I have hereunto set my hand on this sixth day of September, A. D. 1929.

HENRY R. MINOR.